(12) United States Patent
Engelhardt et al.

(10) Patent No.: US 6,483,103 B2
(45) Date of Patent: Nov. 19, 2002

(54) APPARATUS FOR SELECTING AND DETECTING AT LEAST ONE SPECTRAL REGION OF A SPECTRALLY SPREAD LIGHT BEAM

(75) Inventors: Johann Engelhardt, Bad Schoenborn (DE); William C. Hay, Heppenheim (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 78 days.

(21) Appl. No.: 09/783,220

(22) Filed: Feb. 15, 2001

(65) Prior Publication Data

US 2002/0109079 A1 Aug. 15, 2002

(30) Foreign Application Priority Data

Feb. 15, 2000 (DE) .......................................... 100 06 800

(51) Int. Cl.⁷ .................................................. G01J 3/28
(52) U.S. Cl. ....................................... 250/226; 356/326
(58) Field of Search ............................... 250/226, 216, 250/339.07; 356/326, 328, 317, 318, 319, 324, 445

(56) References Cited

U.S. PATENT DOCUMENTS 5,831,729 A * 11/1998 Kuze ........................... 356/328
5,886,784 A   3/1999 Engelhardt .................. 356/326

FOREIGN PATENT DOCUMENTS

DE   43 30 347    4/1998
DE   199 02 625   9/1999

* cited by examiner

Primary Examiner—Scott J. Sugarman
Assistant Examiner—Richard Hanig
(74) Attorney, Agent, or Firm—Foley & Lardner (57) ABSTRACT

An apparatus for selecting and detecting at least one spectral region of a spectrally spread light beam, preferably in the beam path of a confocal scanning microscope, the spread light beam being focussable in a focal line, is characterized, for non-overlapping detection of the spectrally spread light beam of the selected spectral regions in the context of an increased number of detectors and an error-tolerant arrangement, in that there is arranged in the spread light beam an optical component which reflects and/or refracts the light beam to a detector and whose optically effective region becomes smaller or larger along the surface, so that by orientation of the component with respect to the focal line and the resulting superposition of the focal line and surface, the spectral region arriving at the detector is definable.

45 Claims, 12 Drawing Sheets

APPARATUS FOR SELECTING AND DETECTING AT LEAST ONE SPECTRAL REGION OF A SPECTRALLY SPREAD LIGHT BEAM

CROSS REFERENCE TO RELATED APPLICATIONS

This invention claims priority of a German patent application DE 100 06 800.6 which is incorporated by reference herein.

FIELD OF THE INVENTION

The present invention concerns an apparatus for selecting and detecting at least one spectral region of a spectrally spread light beam, preferably in the beam path of a confocal scanning microscope, the spread light beam being focussable in a focal line.

BACKGROUND OF THE INVENTION

Apparatuses of the generic type are known from DE 43 30 347 and DE 199 02 625. These apparatuses are preferably used in the beam path of confocal laser scanning microscopes, in which context a light beam passing through the detection pinhole is spectrally spread with a dispersive optical component. One part of the spectrally spread light beam can then pass through a first variably arranged mirror stop arrangement. The corresponding spectral region is then detected by a detector. The portion of the spread light beam that strikes the first mirror stop arrangement is reflected at the latter to a further mirror stop arrangement. One part of the originally reflected spectrally spread light beam can pass through the further mirror stop arrangement as well, and is detected with a further detector. The remaining part is reflected by the further mirror stop device to a third detector. Apparatuses of the generic. type have several disadvantages. Strictly speaking, spectrally exact detection of the spectrally spread light beam is possible only if the spread light beam is focused directly onto a focal line, on which a selection of the spectral regions to be detected is performed. The spectral regions of the spectrally spread light beam overlap in front of or behind the focal line, so that sharp spectral detection is possible only to a limited extent. The apparatuses known from the existing art provide for division into the individual spectral regions only in the closer vicinity of the focus line, where selection of the spectral regions to be detected is still tolerable in terms of spectral overlap. When a larger number of regions needs to be detected, refocusing of the selected spectral region is moreover necessary because of the cascaded detector arrangement, since otherwise the optical paths of the diverging light beam can no longer be imaged onto a detector having a limited area. The three-dimensional arrangement of the optical components and detectors, in particular, is extremely problematic in this context because of the optical boundary conditions, so that only a limited number of different spectral regions is detectable. In addition, the error tolerance for positioning the optical components of the apparatuses known hitherto is extremely small due to their cascaded arrangement. For example, misalignment of a first mirror stop arranged in the spectrally spread light beam has a negative effect on all the detectors downstream from it, thus reducing their detection efficiency.

SUMMARY OF THE INVENTION

It is therefore the object of the invention to configure and further develop an apparatus for selecting and detecting at least one spectral region of a spectrally spread light beam.

The object is achieved by an apparatus for selecting and detecting at least one spectral region of a spectrally spread light beam comprising: a focal line defined by the apparatus wherein the spread light beam being focussable in said focal line, an optical component being arranged in the spread light beam wherein the optical component changes the direction of at least a portion of the spread light beam; and wherein the superposition of the portion of the spread light beam and the optical component defines an active region, and a detector being arranged with respect to the optical component and receiving a smaller or larger portion of a spectral region depending on the size of the active region.

It is a further object of the invention to provide an apparatus to configure and further develop an apparatus for selecting and detecting at least one spectral region of a spectrally spread light beam. Furthermore, detection with more than the hitherto achievable number of detectors is also intended to be possible.

The object is achieved by an apparatus for selecting and detecting at least one spectral region of a spectrally spread light beam comprising: a focal line defined by the apparatus wherein the spread light beam being focussable in said focal line, a plurality of optical components being arranged in the spread light beam wherein the optical components change the direction of at least a portion of the spread light beam, the optical components are arranged in such a way that they contact one another at the location of the focal line, so that uninterrupted detection of the portion of spectral spread light beam is possible; and wherein the superposition of the portion of the spread light beam with each the optical component defines an active region, and at least one detector being arranged with respect to the optical components and receiving a smaller or larger portion of a spectral region depending on the size of the active regions.

An additional object of the invention is to provide a confocal scanning microscope which selects a spectrally spread light beam and the spectral regions do not overlap. It is also intended to increase the error tolerance relating to the arrangement of the optical components of the confocal scanning microscope.

The object is achieved by a confocal scanning microscope for selecting and detecting at least one spectral region of a spectrally spread light beam comprising: a focal line defined by the confocal scanning microscope wherein the spread light beam being focussable in said focal line, an optical component being arranged in the spread light beam wherein the optical component changes the direction of at least a portion of the spread light beam; and wherein the superposition of the portion of the spread light beam and the optical component defines an active region, and at least one detector being arranged with respect to the optical component and receiving a smaller or larger portion of a spectral region depending on the size of the active region.

What has been recognized firstly according to the present invention is that with a mirror stop and detector apparatus that is not arranged in cascaded fashion, the entire apparatus can be considerably simplified. Additional focusing can be eliminated because the optical paths of the divergently extending light are reduced in proportion to the portion to be provided for cascading of the detector arrangement. The divergently extending light then no longer needs to be focused in order to be imaged onto a detector having a limited detection area. In addition, the error tolerance for positioning the optical components can be enhanced by eliminating the cascaded detection apparatus, since it is no longer necessary to provide so many mutually dependent optical components in the beam path. In the same fashion, this is very advantageous for the chain of tolerances in the positioning and alignment accuracy of the individual optical components.

According to the present invention, a cascaded arrangement of the optical components can be dispensed with because of the particular orientation of a reflective and/or refractive optical component. That optical component is arranged and oriented, relative to the focal line of the spectrally spread light beam, in such a way that only the spectral region resulting from the superposition of the focal line and the surface of the optical component is reflected and/or refracted to the detector. Cascading of multiple optical components arranged one behind another can thereby be eliminated, so that it is advantageously possible to dispense with any additional focusing of the reflected or refracted light beam.

The optical component is configured in such a way that its optically effective region becomes smaller or larger along its surface. As a result, the portion of the spectrally spread light reflected or refracted by the optical component can be made smaller or larger in accordance with the orientation of the optical component relative to the focal line. With the apparatus according to the present invention, it is possible to perform spectral selection with the aid of reflective and/or refractive optical components directly in the focal line, so that the aforementioned spectral overlap, which occurs even in the close vicinity of the focal line, can advantageously be avoided.

In a preferred embodiment, the surface of the optical component is always arranged tangentially to the focal line in its region of superposition with the focal line. In other words, the focal line of the spectrally spread light beam always lies on the surface of the optical component. This arrangement of the optical component ensures spectrally sharp detection, so that selection always occurs in a region of the spectrally spread light beam in which the spectral regions do not overlap.

In particularly advantageous fashion, the optical component is arranged movably so as to allow variable selection of the spectral region.

The motion of the optical component could take place along a direction such that the effective region of the optical component changes relative to the focal line, the result being that the spectral region arriving at the detector becomes larger or smaller. It is thereby possible, advantageously, to modify the initial and final wavelengths, i.e. the width of the spectral region that arrives at the detector associated with the optical component.

The optical component could be moved in a direction parallel to the focal line, as a result of which the spectral region arriving at the detector is modifiable. By way of this motion, the selected spectral region can be modified with no change in width. The initial and final wavelengths of the spectral region can thereby ultimately be varied, while the difference between the final wavelength and initial wavelength—i.e. the spectral width—remains constant. To optimize the detected signal yield, provision is made, when the optical component moves in a direction parallel to the focal line, for the detector associated with the optical component to be moved in the same manner.

In particularly advantageous fashion, the motion of the optical component takes place both along a direction in which the effective region of the optical component changes relative to the focal line, and in a direction parallel to the focal line. It is thereby possible to define both the width and the initial and final wavelengths of the spectral region to be detected, thus offering very particularly flexible application capabilities.

If multiple optical components are used to select multiple spectral regions, the optical components are arranged in such a way that they contact one another at the location of the focal line. This arrangement allows uninterrupted detection of the spectral spread light beam with multiple detectors.

Alternatively to this, a gap could also remain between two optical components along the focal line. The light extending in this gap would thus not be associated with any detector, so the corresponding spectral region is not detected. In particular in the case of a fluorescence microscopy application with a confocal laser scanning microscope, a gap of this kind could be provided at the location of the excitation wavelength of a laser light source, since only the fluorescent light is of interest and is detected.

In an alternative embodiment, the light extending in a gap could be detected by a detector associated with that gap. This feature could above all facilitate make it easier to arrange multiple detectors in three dimensions, especially if the optical components used are of reflective configuration. The detector associated with a gap could thus be arranged, beyond the focal line, in the propagation direction of the spectrally spread light beam, whereas the detectors associated with the optical components configured in reflective fashion can be arranged in the direction of the reflected light. The detectors, which are large compared to the extension of the focal line, can thereby be arranged over a large solid angular region.

With regard to the focal plane spanned by the focal line and the principal beam of the incident light, the optical components could be mounted on both sides of the focal plane. It would thus be conceivable to have one grouping of multiple optical components, arranged next to one another, which are arranged and oriented on the one side of the focal plane. A further grouping of multiple optical components arranged next to one another could correspondingly be arranged on the other side of the focal plane, so that the optical components of one side of the focal plane can cover an optionally continuous spectral range. In an embodiment alternative to the above, an alternating arrangement of the optical components is provided, so that along the focal line, an optical component is arranged on the one side of the focal plane and adjacent to it is an optical component that is arranged on the other side of the focal plane.

In a concrete embodiment, the optical component has a flat surface. To make the optically effective region smaller or larger along the surface of the optical component, its edges are of tapering configuration. The surface shape thereby defined would then correspond, for example, to a trapezoid. The edges of the optical component could meet at an edge intersection point, so that the surface of the optical component would have the shape of a triangle.

In a concrete embodiment, the optical components are movably arranged in such a way that the edge intersection points of multiple optical components arranged next to one another meet, in a basic setting, substantially at one point. From this basic setting, the individual optical components could then be arranged relative to the focal line. For space reasons, the motion of one optical component can entail the motion of other optical components.

A wedge, a pyramid, a tetrahedron, or an obelisk could be provided as the shape of an optical component. It would also be conceivable to use optical components of different shapes.

The optical component could be embodied as a prism or as a light collector that refracts the light striking its surface. In this context, the shape of the prism and its refractive index are selected in such a way that the refraction of the light striking its surface occurs as efficiently as possible, i.e. exhibits minimal reflection. A Plexiglas block of funnel-shaped configuration could, for example, serve as the light collector; very generally, the latter can be a light guide.

The light refracted by the prism or light collector is directed by total internal reflection to the detector. The detector can be in effective engagement directly with the optical component, so that direct detection of the refracted light can occur. To promote total internal reflection by the prism or light collector, the optical component has at least partially mirror-coated outer surfaces.

In an alternative embodiment, the optical component is embodied as a mirror that reflects the light striking its surface. The mirror could comprise, for example, a wedge-shaped component on whose surface a mirror layer is applied. If the surface of the mirror is flat, the motion of the component relative to the focal line always occurs in a direction that lies in the plane of the mirror surface.

In an alternative embodiment, the mirror has a cylindrical surface. In that context, the optical component could have the form of an obliquely cut-off cylinder, or that of a cylinder section. The corresponding cylindrical envelope section is, in this context, equipped with a reflecting surface so that the optically effective region of said cylindrical envelope section is configured to be smaller or larger along its surface.

The cylindrical optical components are guided on an axis arranged parallel to the focal line. This guide axis coincides with the axis of an obliquely cut-off cylinder or that of a cylinder section. The spacing of a guide axis of the cylindrical optical components from the focal line corresponds to the radius of the cylindrical optical components. This ensures that the cylindrical surface of the optical component are always arranged, in its region of superposition with the focal line, tangentially with respect to the focal line.

Taking into consideration the various possible arrangements of the optical components so far mentioned, when cylindrical components are used, multiple axes are provided on which the cylindrical optical components are guided. The spacings of the individual axes from the focal line can be different.

By rotation of a cylindrical optical component about its axis, the spectral region arriving at the detector can be made larger or smaller. If the cylindrical optical component is moved along the direction of its guide axis, the spectral region arriving at the detector can be modified with no change in the spectral width. A superimposition of the two forms of motion of a cylindrical optical component—i.e. rotation about its axis and motion along the direction of its axis—makes possible flexible selection of a spectral region, so that in principle the latter is unrestrictedly adjustable in terms of both its width and its position along the focal line.

With regard to the physical arrangement of the detectors, it is advantageous if the surface normal lines of the various optical components point in different directions at the location of the focal line. This is relevant in particular when optical components embodied as mirrors are used. In this case the detector associated with an optical component is arranged in the direction of the principal beam of the reflected light. This makes possible the placement of a large number of detectors, since as a result of the orientation of the surface normal lines of the individual optical components, almost the entire solid angular region transverse to the focal line is available.

When cylindrical optical components are used, the number of guide axes used defines the different directions of the possible surface normal lines. Advantageously, the axes could be arranged at different spacings from the focal line, i.e. the cylindrical surfaces of the components having different axes have a different radius of curvature. In addition, the cylindrical optical components having different guide axes could be arranged next to one another along the focal line. In this case the detectors of directly adjacent cylindrical optical components are arranged in different directions, so that by skillful arrangement of the cylindrical optical components, it is again possible to use many detectors.

BRIEF DESCRIPTION OF THE DRAWINGS

There are various ways of advantageously embodying and developing the teaching of the present invention. Reference is made to the specification and the drawings. In the drawings.

DETAILED DESCRIPTION OF THE INVENTION

Figure 1:
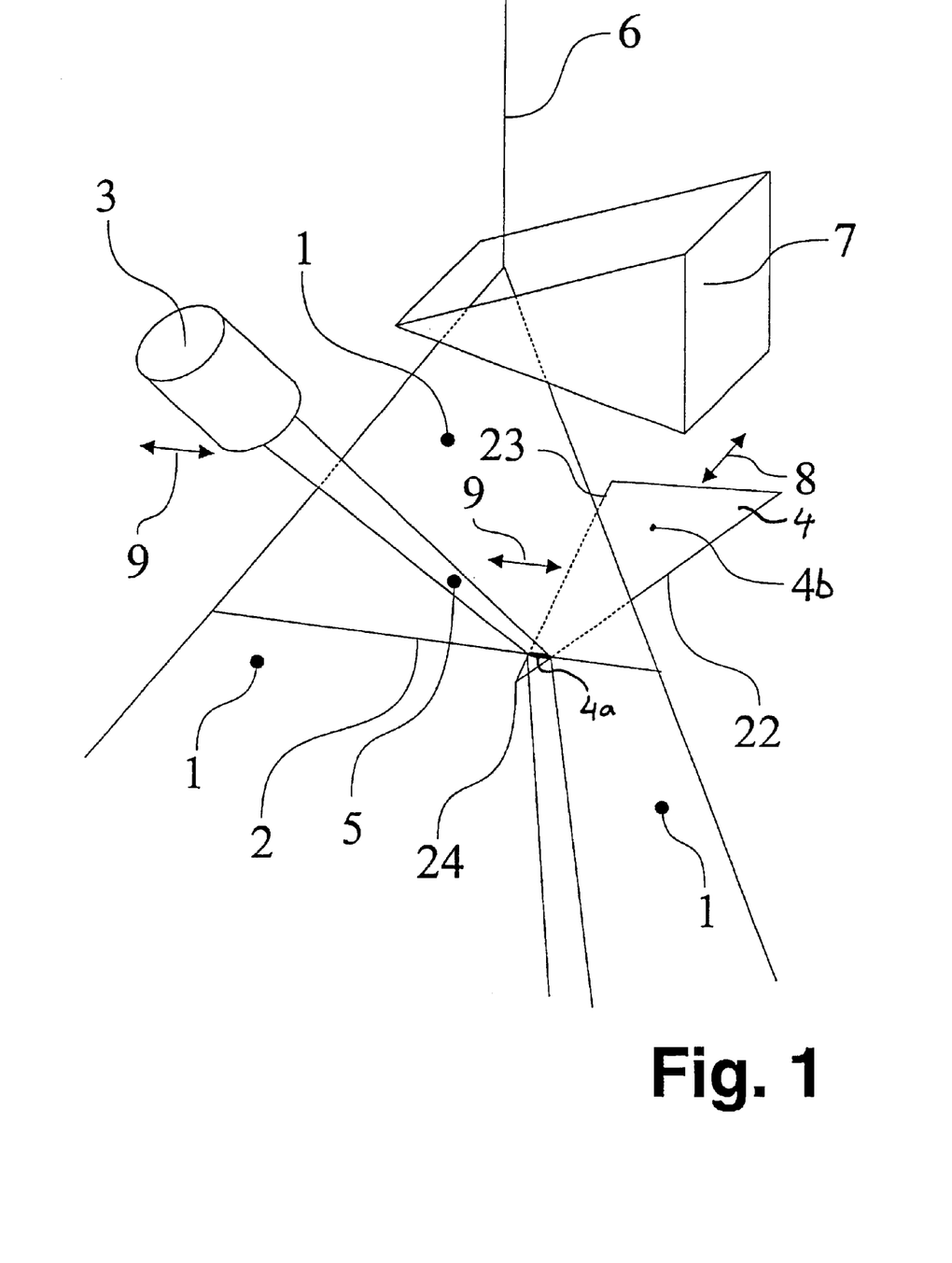
FIG. 1 shows a schematic three-dimensional depiction of an embodiment according to the present invention.

FIG. 1 shows an apparatus for selecting and detecting at least one spectral region of a spectrally spread light beam 1 in the beam path of a confocal scanning microscope, spread light beam 1 being focusable in a focal line 2.

According to the present invention, there is arranged in the spread light beam 1 an optical component 4 which directs the light beam to one detector 3. The optical component, if configured as a mirror, reflects the light beam to the detector 3. The optical component 4, if configured as a prism or the like, refracts the light beam to the detector 3. The optical component 4 defines an active region 4a which becomes smaller or larger along the surface 4b of the optical component. According to the orientation of component 4 with respect to focal line 2 and the resulting superposition of focal line 2 and the surface 4b, the spectral region 5 arriving at detector 3 is definable. It is also evident from FIG. 1 that incident light beam 6 is spectrally dispersed by a prism 7 arranged in beam 6.

Optical component 4 is arranged in such a way that its surface in the region of superposition with focal line 2 is always tangential to focal line 2.

Optical component 4 is arranged movably. The motion of optical component 4 can take place either along a direction 8 or along a direction 9. If optical component 4 is moved along direction 8, the effective region of optical component 4 changes relative to focal line 2. Spectral region 5 arriving at detector 3 is thereby made larger or smaller. When optical component 4 is moved in a direction 9 parallel to focal line 2, spectral region 5 arriving at detector 3 can be modified in terms of its initial and final points with no change in width.

If optical component 4 is moved along direction 9, detector 3 associated with optical component 4 is moved in the same manner. This motion also takes place along direction 9.

Figure 2:
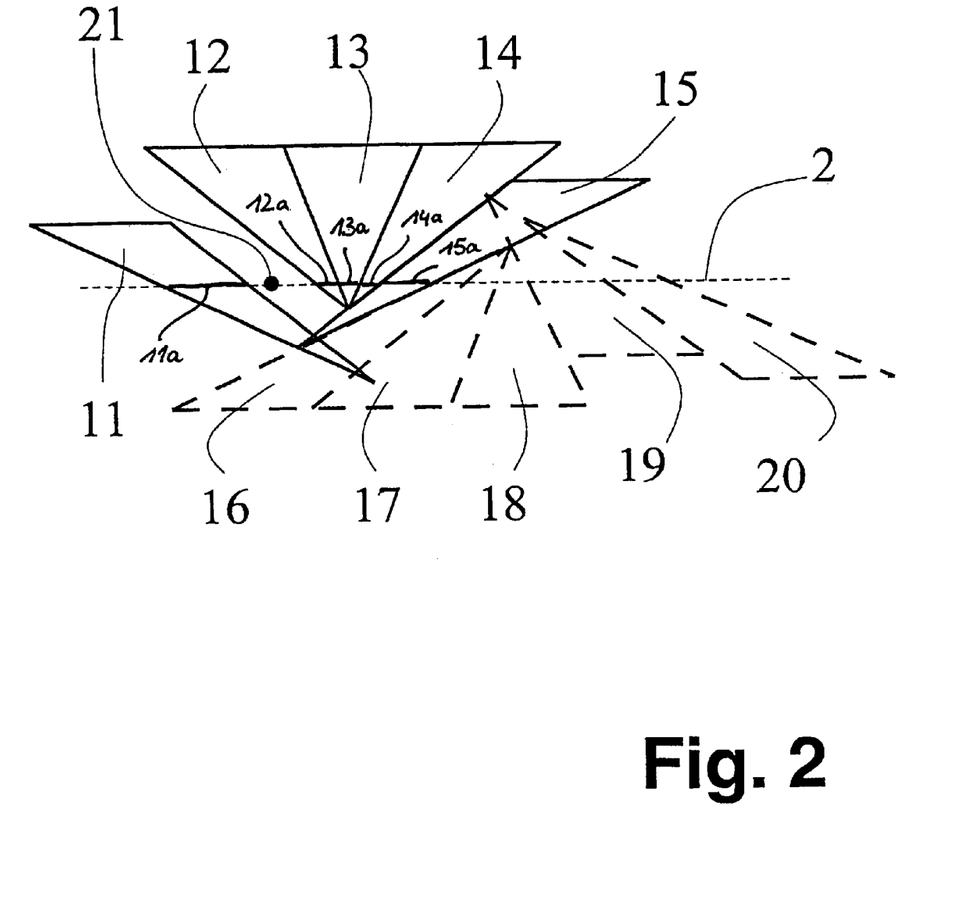
FIG. 2 shows a plan view of a schematic depiction of an alternative exemplary embodiment according to the present invention.
Figure 3:
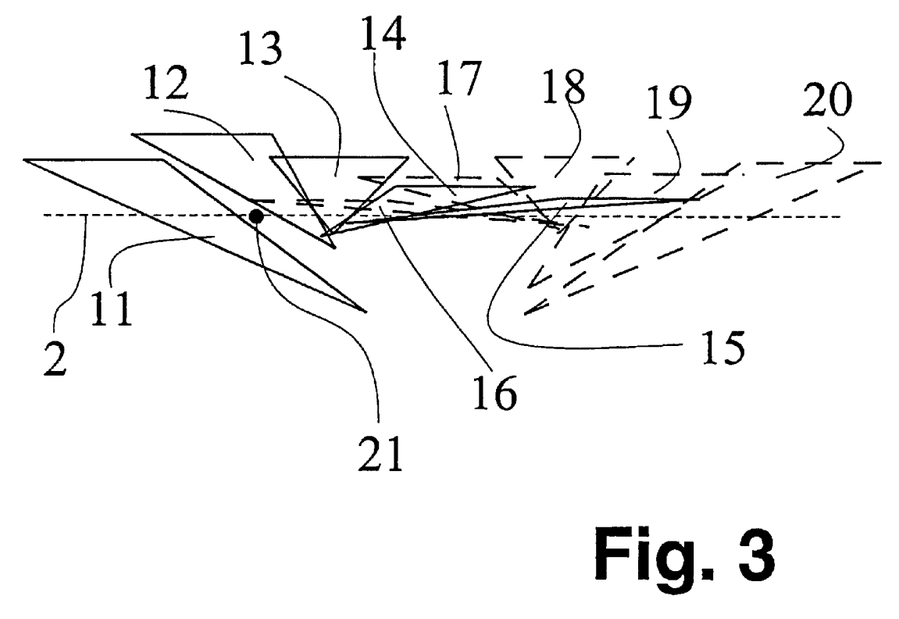
FIG. 3 shows a schematic side view of the exemplary embodiment from FIG. 2.

An alternative embodiment of the apparatus according to the present invention is evident from FIGS. 2 and 3. Multiple optical components 12, 13, 14, and 15 are arranged in such a way that they contact one another at the location of focal line 2. This allows, for the effective region of optical components 12, 13, 14, and 15, uninterrupted detection of spectrally spread light beam 1. Each optical component 12, 13, 14 and 15 defines an active region 12a, 13a, 14a and 15a at the location of the focal line 2. Optical components 16, 17, 18, 19, and 20, indicated with dashed lines, contact one another in the same fashion, so that this corresponding spectral region of focal line 2 is also uninterruptedly detectable. A gap 21 that is not reflected or refracted by any optical component is provided between optical components 11 and 12.

Figure 4:
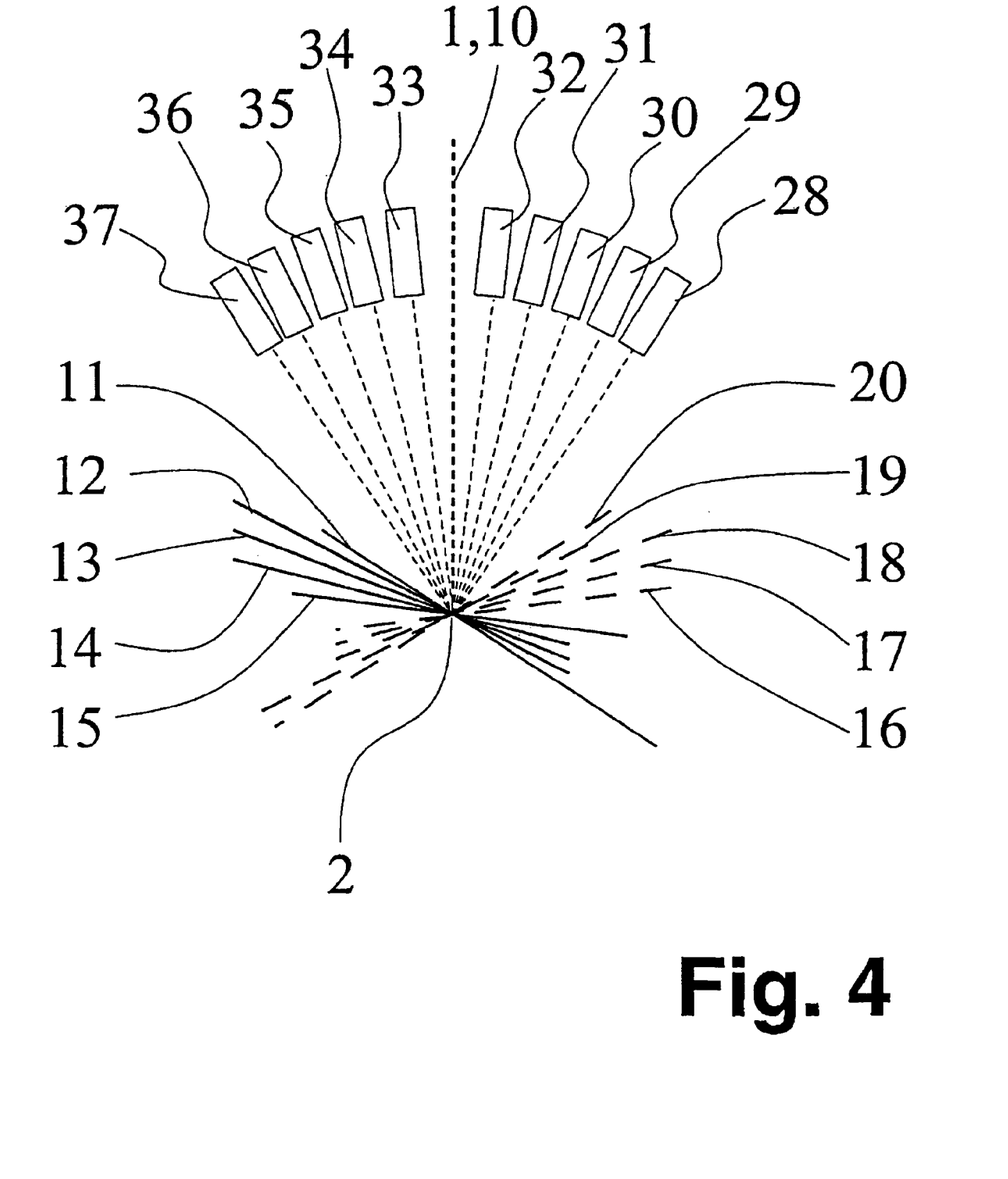
FIG. 4 shows a schematic side view of the exemplary embodiment from FIGS. 2 and 3.

Spectrally spread light beam 1 and focal line 2 span focal plane 10. It is evident from the schematic side view in FIG. 4 that optical components 11 through 15 are mounted on the one side of focal plane 10, and optical components 16 through 20 are mounted on the other side of focal plane 10. FIG. 4 indicates only the surfaces of optical components 11 through 20, which are thus depicted in side view as strips. Optical components 11 through 20 in FIGS. 2, 3, and 4 have a flat surface.

It is evident from FIGS. 1 through 3 that edges 22 and 23 of optical component 4 are of tapering configuration, and moreover meet at an edge intersection point 24. Optical component 4 has a triangular surface.

Figure 5:
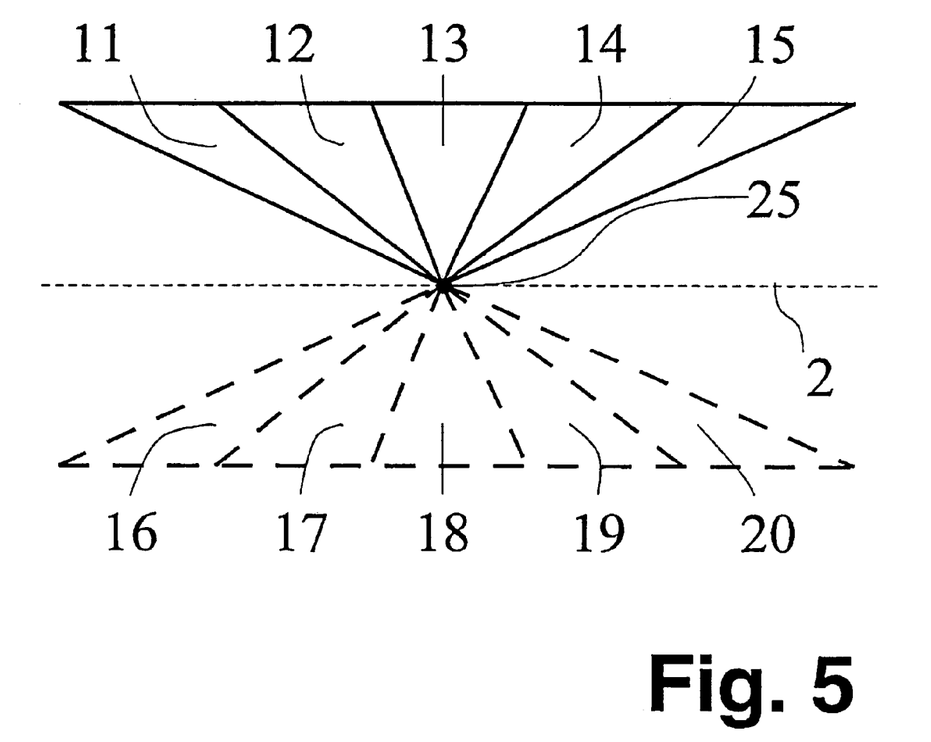
FIG. 5 shows a schematic plan view of the exemplary embodiment from FIG. 2, in which the individual optical components are arranged differently.
Figure 6:
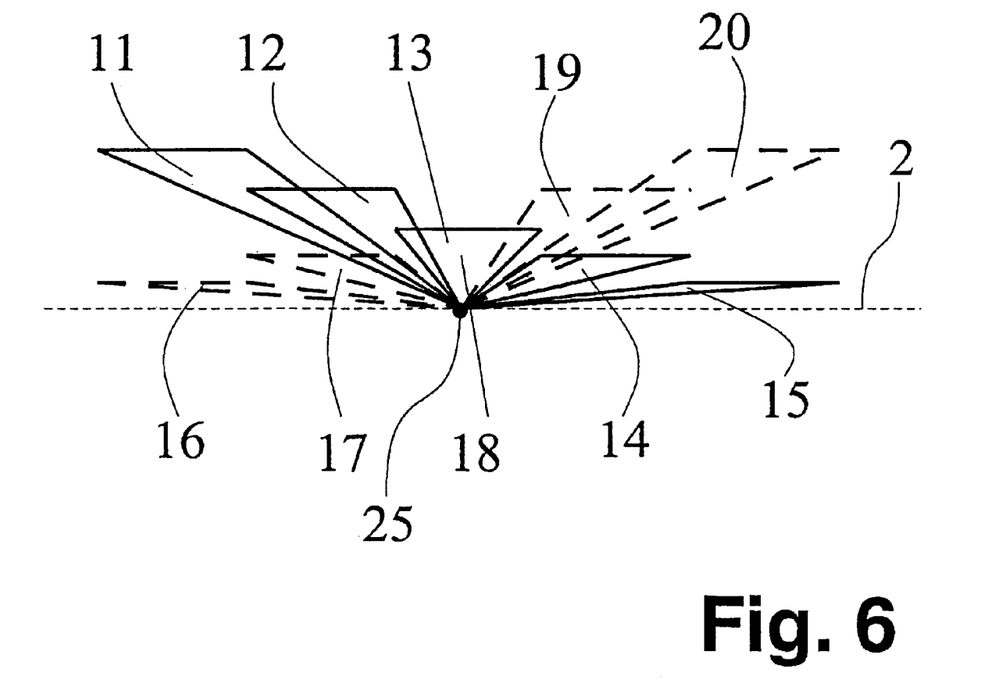
FIG. 6 shows a schematic side view of the exemplary embodiment from FIG. 5.
Figure 7:
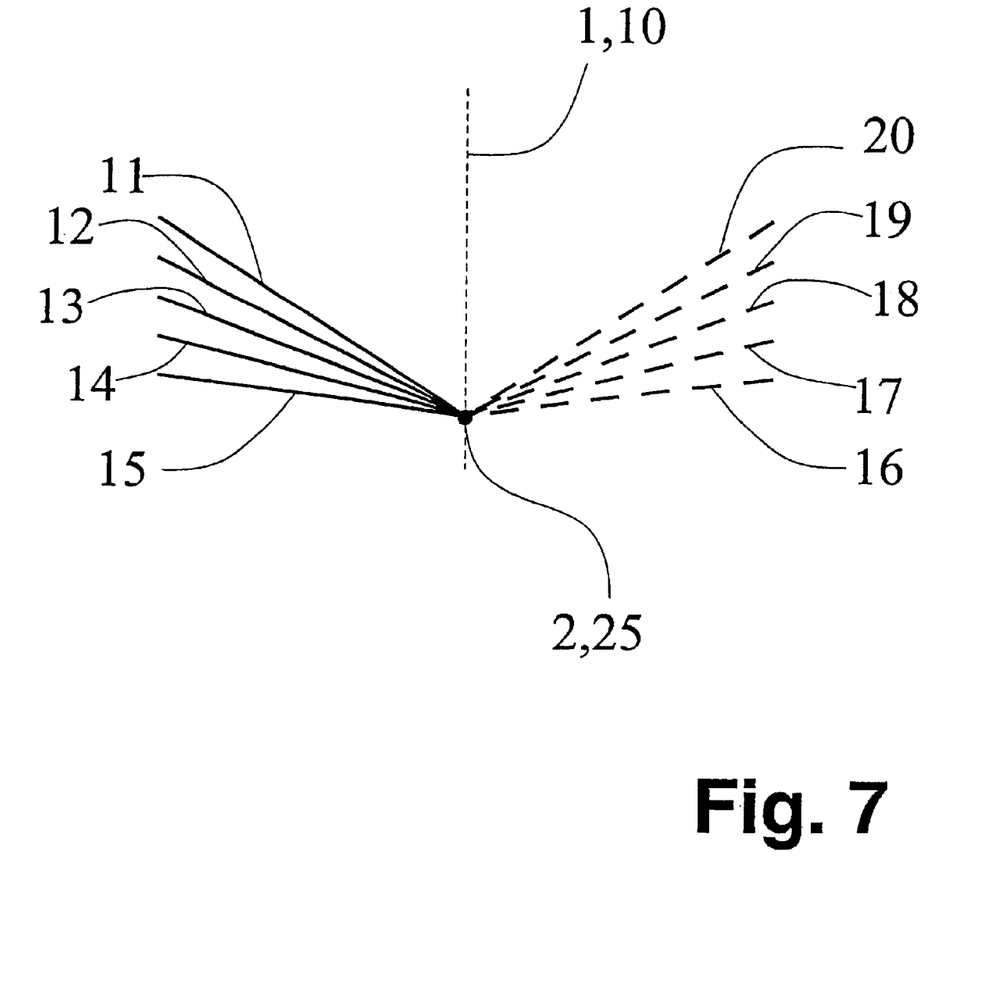
FIG. 7 shows a schematic side view of the exemplary embodiment from FIG. 5 and FIG. 6.

FIGS. 5, 6, and 7 show the exemplary embodiment of FIGS. 2, 3, and 4 with optical components 11 through 20 in a different setting. It is evident from FIGS. 5 and 7 in particular that in a basic setting, the edge intersection points of several optical components 11, 12, 13, 14, 15 and 16, 17, 18, 19, 20 arranged next to one another meet substantially at one point 25. Point 25 lies on focus line 2, so that in this instance no portion of spectrally spread light beam 1 arrives at any of the detectors associated with optical components 11 through 20. In this exemplary embodiment, this basic setting is used for spectral calibration of components 11 through 20.

Optical components 11 through 20 are configured in the form of a wedge, although in FIGS. 2 through 7 only the surfaces of the individual wedge-shaped optical components are indicated.

Figure 8:
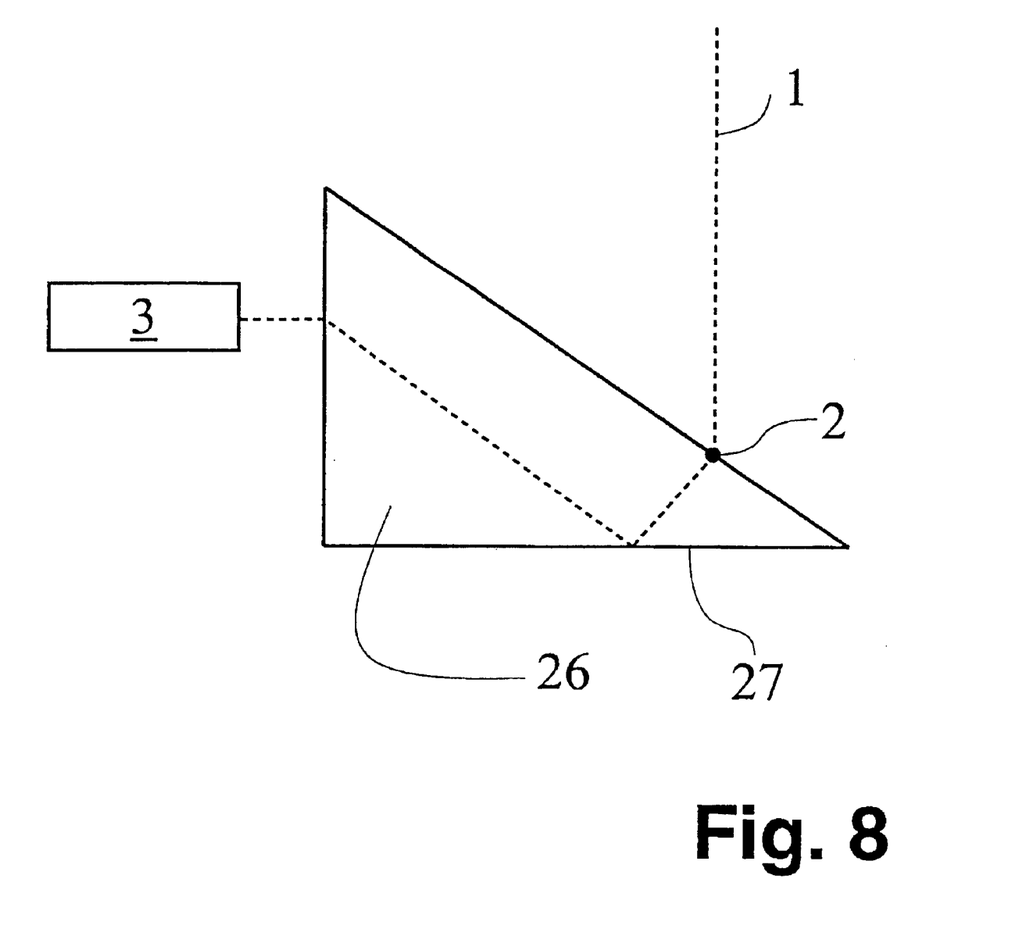
FIG. 8 shows a schematic depiction of an alternative exemplary embodiment of the apparatus according to the present invention.
Figure 9:
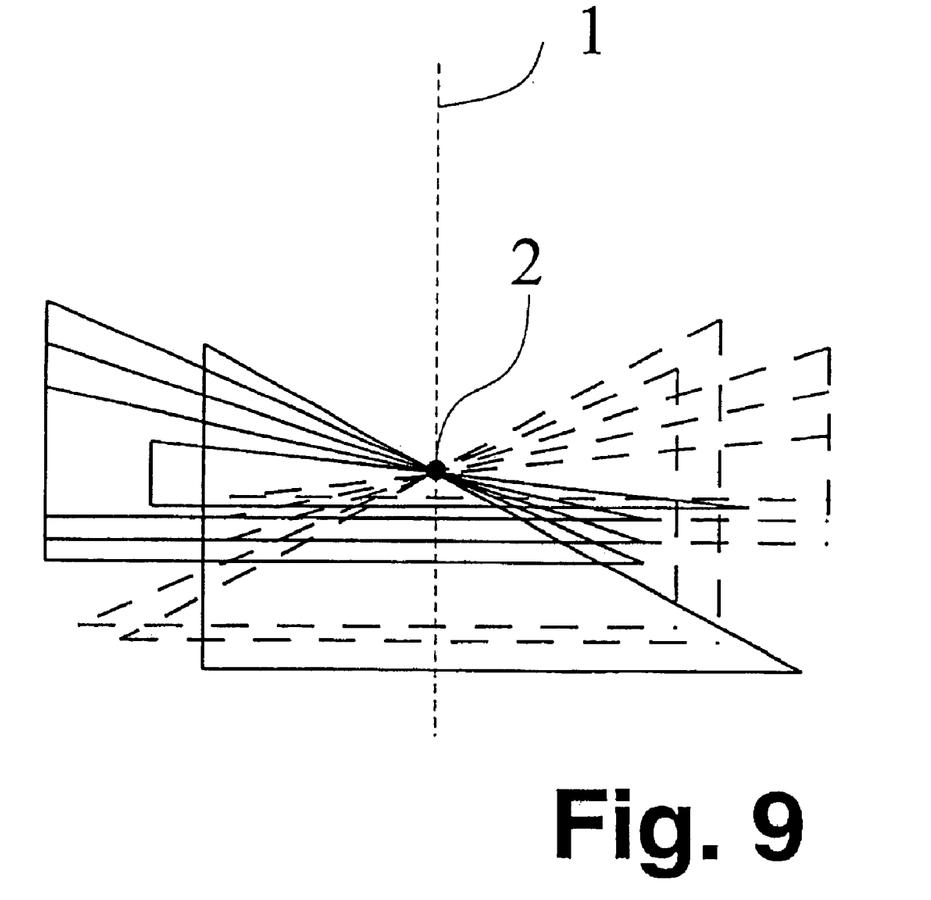
FIG. 9 shows a schematic side view of a concrete exemplary embodiment in accordance with FIG. 8.

FIG. 8 shows an alternative exemplary embodiment. Here the optical component is configured as prism 26. Light 1 striking its surface is refracted by prism 26. The light thus refracted is directed, by total internal reflection at mirror-coated outer surface 27, to detector 3 associated with prism 26. FIG. 9 shows a side view of an exemplary embodiment with multiple pyramidal prisms.

Figure 10:
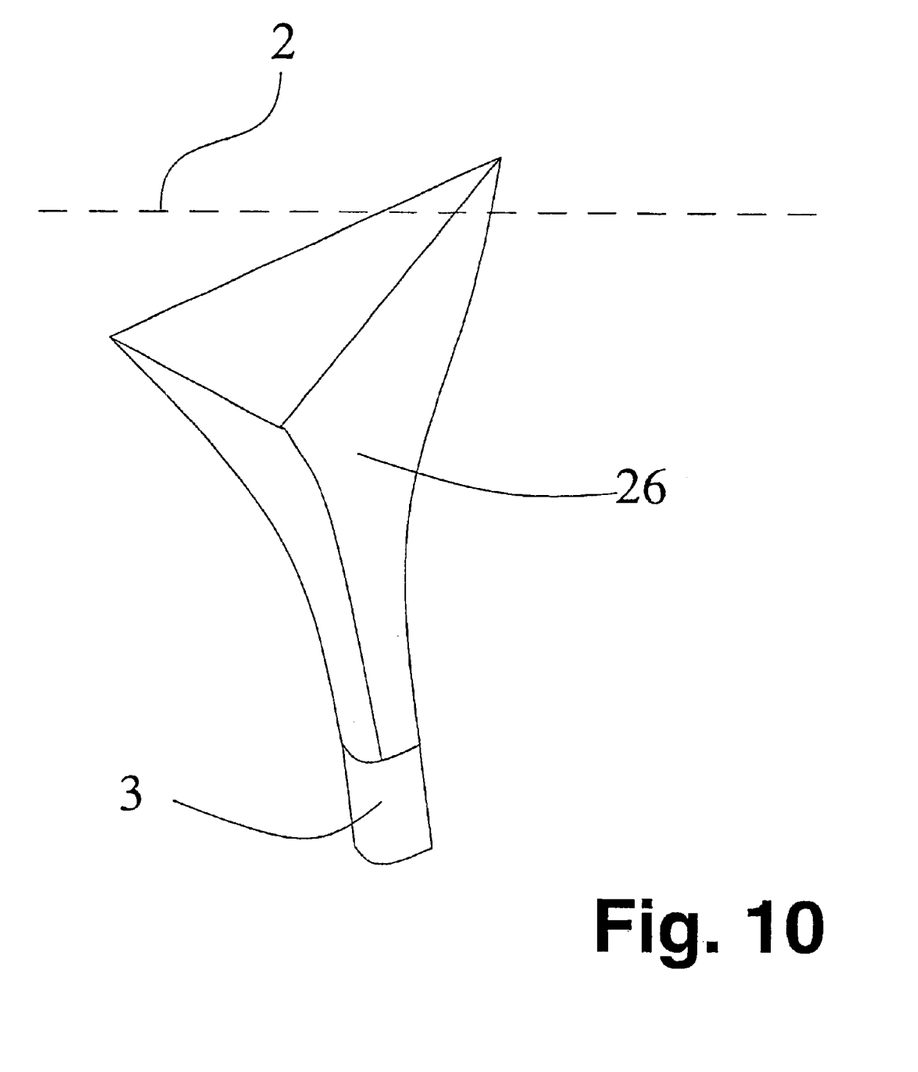
FIG. 10 shows, in a schematic three-dimensional view, an alternative exemplary embodiment of the apparatus according to the present invention.

FIG. 10 shows a light collector 26, made of Plexiglas, that is joined directly to detector 3 associated with it. In the case of light collector 26 as well, the light striking its surface is refracted and is directed by total internal reflection to detector 3.

In contrast thereto, optical components 11 through 20 are configured as mirrors which reflect the light striking their surfaces to detectors 28 through 37 associated with them. This is evident from FIG. 4.

Figure 11:
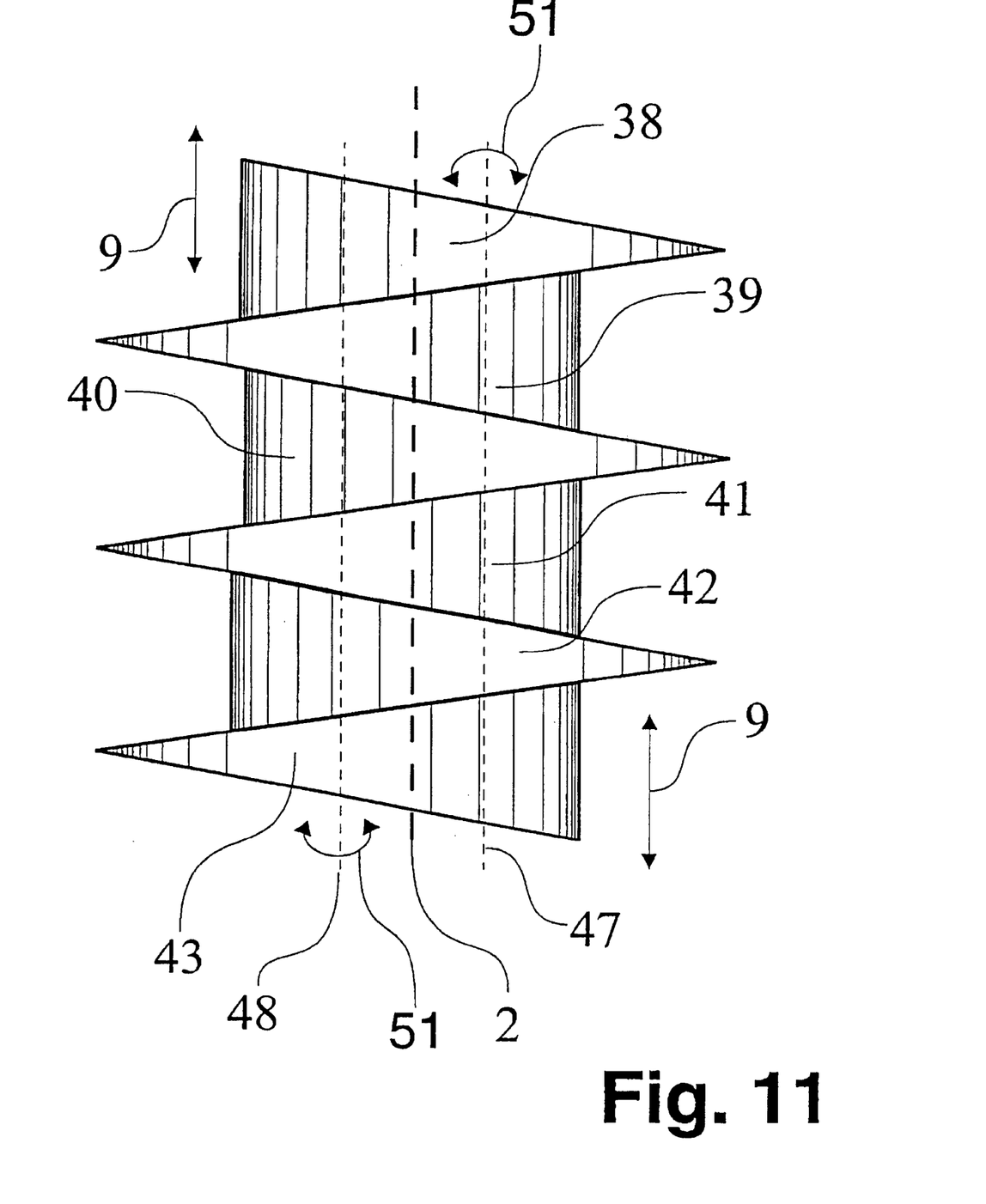
FIG. 11 shows, in a schematic depiction, a plan view of a further exemplary embodiment of the apparatus according to the present invention.

FIG. 11 shows a plan view of an alternative exemplary embodiment. Here optical components 38 through 43 are embodied as mirrors which have a cylindrical surface. Optical components 38 through 43 are cylinder sections whose cylinder section envelopes are equipped with a mirror-coated surface.

Figure 12:
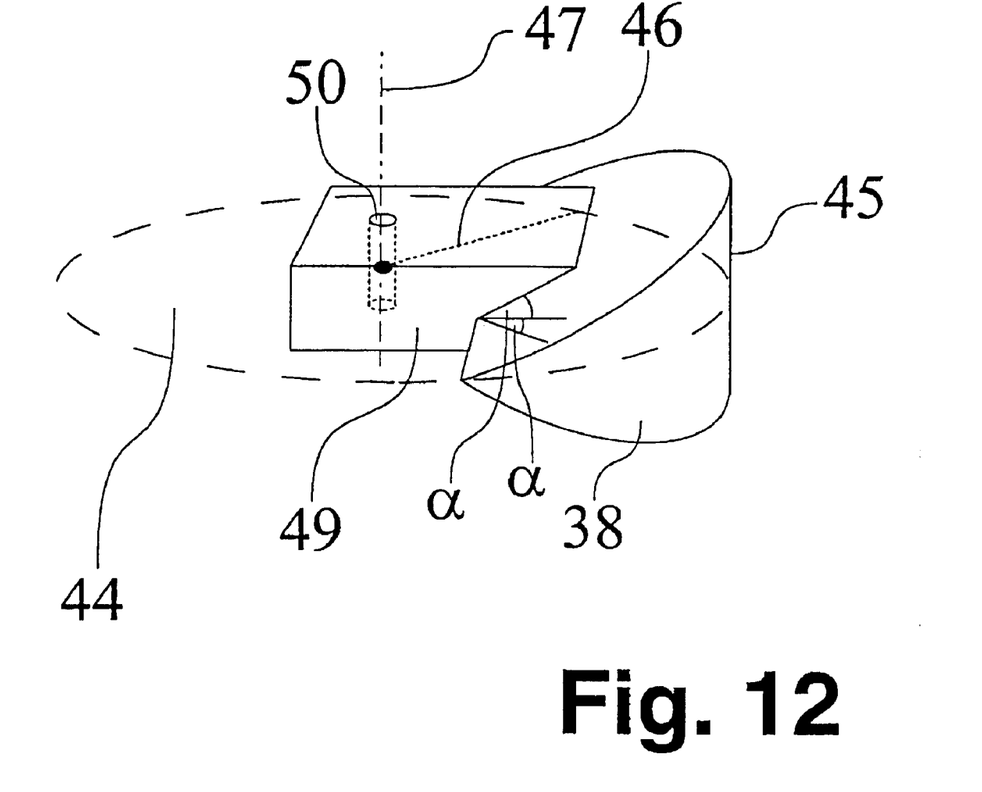
FIG. 12 shows a schematic three-dimensional side view of an optical component from FIG. 11.

Optical component 38 is shown in the schematic three-dimensional view of FIG. 12. The cylinder section is simply a cylinder segment cut off obliquely at both ends. With respect to its symmetry plane 44, the cylinder section has two flat surfaces that each extend at an angle α of 10° with respect to symmetry plane 44 and meet at a common line, also in symmetry surface 44. The mirror-coated surface 45 of cylinder section 38 has a radius 46 in symmetry plane 44. An attachment means 49 that has a guide bore 50 is provided for optical component 38. The entire component 49, 38 is rotatable and displaceable, by way of guide bore 50, relative to axis 47 (not shown in FIG. 12).

It is evident from FIG. 11 that cylindrical optical components 38, 40, and 42 are guided on axis 47. Cylindrical optical components 39, 41, and 43 are guided on guide axis 48. The cylindrical optical components can be rotated with respect to their axis 47 or 48 in directions 51, as a result of which the spectral region arriving at the detector can be made respectively larger or smaller. In addition, the cylindrical optical components are movable along direction 9 of their guide axis 47 or 48, or parallel to focus line 2, as a result of which the spectral region arriving at the detector can be modified while the width is the same.

It may be seen from FIGS. 4 and 7 that the surface normal lines of the various optical components 11 through 20 at the location of focal line 2 point in different directions. FIG. 4 correspondingly shows that the different spectral regions of focal line 2 of incident light beam 1 are reflected in different directions to detectors 28 through 37. In this context, detection with detectors 28 through 37 takes place simultaneously.

Lastly, be it noted that the exemplary embodiments set forth above contribute to an understanding of the teaching claimed, but do not limit it to the exemplary embodiments.

What is claimed is:

1. An apparatus for selecting and detecting at least one spectral region of a spectrally spread light beam (1) comprising:
   a focal line (2) defined by the apparatus wherein the spread light beam (1) being focussable in said focal line (2),
   an optical component (4) being arranged in the spread light beam (1) wherein the optical component (4) changes the direction of at least a portion of the spread light beam (1); and wherein the superposition of the portion of the spread light beam (1) and the optical component (4) defines an active region (4a), and a detector (3) being arranged with respect to the optical component (4) and receiving a smaller or larger portion of a spectral region (5) depending on the size of the active region (4a).

2. The apparatus as defined in claim 1 wherein the optical component (4) reflects the portion of the spread light beam (1).

3. The apparatus as defined in claim 2, characterized in that the optical component (4) is a mirror and has a cylindrical surface.

4. The apparatus as defined in claim 3, characterized in that the optical component (4) has the form of an obliquely cut-off cylinder.

5. The apparatus as defined in claim 1 wherein the optical component (4) refracts the portion of the spread light beam (1).

6. The apparatus as defined in claim 1, characterized in that the optical component (4) defines a surface (4b) of the is always arranged tangentially to the focal line (2) in its region of superposition with the focal line (2).

7. The apparatus as defined in claim 6, characterized in that surface (4b) of the optical component (4) is a flat.

8. The apparatus as defined in claim 1, characterized in that the optical component (4) is arranged movably.

9. The apparatus as defined in claim 8, characterized in that the optical component (4) is movable along a direction (8) such that the active region (4a) of the optical component (4) changes relative to the focal line (2), and the spectral region (5) arriving at the detector (3) changes with the movement of the optical component (4).

10. The apparatus as defined in claim 8, characterized in that the optical component (4) is movable in a direction (9) parallel to the focal line (2), wherein the size of the active region (4a) remains constant result and the spectral region (5) arriving at the detector (3) is changed.

11. The apparatus as defined in claim 10, characterized in that when the optical component (4) moves in the direction (9) parallel to the focal line (2), the detector (3) associated with the optical component (4) is moved in the same manner.

12. The apparatus as defined in claim 1, characterized in that the optical component (4) defines edges (22, 23) which are of tapering configuration.

13. The apparatus as defined in claim 12, characterized in that the edges (22, 23) of the optical component (4) meet at a point (24).

14. The apparatus as defined in claim 13, characterized in that the optical component (4) has a triangular surface and is configured as a wedge, a pyramid, a tetrahedron, a prism (26), or an obelisk.

15. The apparatus as defined in claim 14, characterized in that the light refracted by the prism (26) is directed by total internal reflection to the detector (3).

16. An apparatus for selecting and detecting at least one spectral region of a spectrally spread light beam (1) comprising:
   a focal line (2) defined by the apparatus wherein the spread light beam (1) being focussable in said focal line (2),
   a plurality of optical components (11, 12, 13, 14, 15) being arranged in the spread light beam (1) wherein the optical components (11, 12, 13, 14, 15) change the direction of at least a portion of the spread light beam (1), the optical components (11, 12, 13, 14, 15) are arranged in such a way that they contact one another at the location of the focal line (2), so that uninterrupted detection of the portion of spectral spread light beam (1) is possible; and wherein the superposition of the portion of the spread light beam (1) with each the optical component (11, 12, 13, 14, 15) defines an active region (11a, 12a, 13a, 14a, 15a), and
   at least one detector (3) being arranged with respect to the optical components (11, 12, 13, 14, 15) and receiving a smaller or larger portion of a spectral region (5) depending on the size of the active regions (11a, 12a, 13a, 14a, 15a).

17. The apparatus as defined in claim 16 wherein the optical components (11, 12, 13, 14, 15) reflect the portion of the spread light beam (1).

18. The apparatus as defined in claim 17, characterized in that the optical components (11, 12, 13, 14, 15) are configured as mirrors and have a cylindrical surface.

19. The apparatus as defined in claim 16 wherein the optical components (11, 12, 13, 14, 15) refract the portion of the spread light beam (1).

20. The apparatus as defined in claim 16, characterized in that a gap (21) remains between two optical components (11, 12) along the focal line (2).

21. The apparatus as defined in claim 20, characterized in that the light extending in this gap (21) is detectable by a detector associated with the gap (21).

22. The apparatus as defined in claim 16, characterized in that the optical components (11, 12, 13, 14, 15; 16, 17, 18, 19, 20) are mounted on both sides of the focal plane (10) spanned by the focal line (2) and the principal beam of the incident light.

23. The apparatus as defined claim 22, characterized in that the optical components (11, 12, 13, 14, 15; 16, 17, 18, 19, 20) have a flat surface.

24. The apparatus as defined in claim 23, characterized in that the edge intersection points (24) of multiple optical components (11, 12, 13, 14, 15; 16, 17, 18, 19, 20) arranged next to one another meet, in a basic setting, substantially at one point (25).

25. The apparatus as defined in claim 18, characterized in that the optical components (12, 13, 14, 15) have the form of an obliquely cut-off cylinder.

26. The apparatus as defined in claim 25, characterized in that the optical component (38, 39, 40, 41, 42, 43) has the form of a cylinder section.

27. The apparatus as defined in claim 25, characterized in that the cylindrical optical components define two axes (47, 48) which are parallel to the focal line (2) and are guided on at least one axis (47, 48).

28. The apparatus as defined in claim 27, characterized in that by rotation of the cylindrical optical components (38, 39, 40, 41, 42, 43) about their axis (47, 48), the spectral region arriving at the detector is changed.

29. The apparatus as defined in claim 27, characterized in that by movement of the cylindrical optical components (38, 39, 40, 41, 42, 43) along the direction of their guide axis (47, 48), the spectral region arriving at the detector (3) is modified.

30. The apparatus as defined in claim 16, characterized in that the surface normal lines of various optical components (11, 12, 13, 14, 15; 16, 17, 18, 19, 20) point in different directions at the location of the focal line (2).

31. The apparatus as defined in claims 16, characterized in that each of a plurality of detectors (28, 29, 30, 31, 32, 33, 34, 35, 36, 37) is associated with an optical component (11, 12, 13, 14, 15; 16, 17, 18, 19,20) being arranged in the direction of the principal beam of the reflected light.

32. The apparatus as defined in claims 31, characterized in that detection by multiple detectors (28, 29, 30, 31, 32, 33, 34, 35, 36, 37) takes place simultaneously.

33. A confocal scanning microscope for selecting and detecting at least one spectral region of a spectrally spread light beam (1) comprising:

a focal line (2) defined by the confocal scanning microscope wherein the spread light beam (1) being focussable in said focal line (2), an optical component (4) being arranged in the spread light beam (1) wherein the optical component (4) changes the direction of at least a portion of the spread light beam (1); and wherein the superposition of the portion of the spread light beam (1) and the optical component (4) defines an active region (4a), and at least one detector (3) being arranged with respect to the optical component (4) and receiving a smaller or larger portion of a spectral region (5) depending on the size of the active region (4a).

34. The confocal scanning microscope as defined in claim 33 comprises a plurality of optical components (12, 13, 14, 15) being arranged in the spread light beam (1) and the optical components (12, 13, 14, 15) are arranged in such a way that they contact one another at the location of the focal line (2), so that uninterrupted detection of the portion of spectral spread light beam (1) is possible.

35. The confocal scanning microscope as defined in claim 33 wherein the optical components (11, 12, 13, 14, 15; 16, 17, 18, 19,20) are mounted on both sides of the focal plane (10) spanned by the focal line (2) and the principal beam of the incident light.

36. The confocal scanning microscope as defined in claim 35 wherein the optical components (11, 12, 13, 14, 15; 16, 17, 18, 19, 20) have a flat surface.

37. The confocal scanning microscope as defined in claim 35 wherein the edge intersection points (24) of multiple optical components (11, 12, 13, 14, 15; 16, 17, 18, 19, 20) arranged next to one another meet, in a basic setting, substantially at one point (25).

38. The confocal scanning microscope as defined in claim 33 wherein the optical components (12, 13, 14, 15) have the form of an obliquely cut-off cylinder.

39. The confocal scanning microscope as defined in claim 33 wherein the optical component (38, 39, 40, 41, 42, 43) has the form of a cylinder section.

40. The confocal scanning microscope as defined in claim 39 wherein the cylindrical optical components define two axes (47, 48) which are parallel to the focal line (2) and are guided on at least one axis (47, 48).

41. The confocal scanning microscope as defined in claim 40 wherein a rotation of the cylindrical optical components (38, 39, 40, 41, 42, 43) about their axis (47, 48) changes the spectral region arriving at the detector (3).

42. The confocal scanning microscope as defined in claim 40 wherein a movement of the cylindrical optical components (38, 39, 40, 41, 42, 43) along the direction of their guide axis (47, 48), modifies the spectral region arriving at the detector (3).

43. The confocal scanning microscope as defined in claim 33 wherein the surface normal lines of various optical components (11, 12, 13, 14, 15; 16, 17, 18, 19, 20) point in different directions at the location of the focal line (2).

44. The confocal scanning microscope as defined in claim 33 wherein each of a plurality of detectors (28, 29, 30, 31, 32, 33, 34, 35, 36, 37) is associated with an optical component (11, 12, 13, 14, 15; 16, 17, 18, 19, 20) being arranged in the direction of the principal beam of the reflected light.

45. The confocal scanning microscope as defined in claim 44 wherein detection by multiple detectors (28, 29, 30, 31, 32, 33, 34, 35, 36, 37) takes place simultaneously.

\* \* \* \* \*